(12) United States Patent
Baert et al.

(10) Patent No.: US 12,496,614 B2
(45) Date of Patent: Dec. 16, 2025

(54) DECORATIVE PANEL AND METHOD FOR PRODUCING A DECORATIVE PANEL

(71) Applicant: Champion Link International Corporation, The Valley (AI)

(72) Inventors: Thomas Luc Martine Baert, Sint-Martens-Latem (BE); Tom Van Poyer, Jiaxing (CN); Sven Boon, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 17/804,133

(22) Filed: May 26, 2022

(65) Prior Publication Data

US 2023/0107500 A1    Apr. 6, 2023

(30) Foreign Application Priority Data

Sep. 29, 2021 (NL) ...................................... 2029278

(51) Int. Cl.
*B05D 5/02* (2006.01)
*B05D 3/06* (2006.01)
(Continued)

(52) U.S. Cl.
CPC ............... *B05D 5/02* (2013.01); *B05D 3/067* (2013.01); *B05D 3/12* (2013.01); *C09D 5/00* (2013.01); *E04F 13/0866* (2013.01); *E04F 13/0871* (2013.01); *E04F 15/107* (2013.01); *E04F 15/02038* (2013.01)

(58) Field of Classification Search
CPC .. B05D 3/067; B05D 3/12; C09D 5/00; E04F 13/0866; E04F 13/0871; E04F 15/107; E04F 15/02038
See application file for complete search history.

(56) References Cited

U.S. PATENT DOCUMENTS

2004/0094262 A1    5/2004  Canti
2008/0113182 A1*   5/2008  MacQueen .......... C09D 133/14
                                                    428/323
(Continued)

FOREIGN PATENT DOCUMENTS

BE          658063         8/1965
CN       101743069 A       6/2010
(Continued)

OTHER PUBLICATIONS

Thomas Luc Martine Baert et al.; Flooring Panel; U.S. Appl. No. 17/380,581, filed Jul. 20, 2021.
(Continued)

*Primary Examiner* — Farah Taufiq
(74) *Attorney, Agent, or Firm* — Heslin Rothenberg Farley & Mesiti P.C.

(57) ABSTRACT

The invention relates to a decorative panel and to a method for producing a decorative panel, in particular a floor panel, wall panel or ceiling panel. The method comprises the steps of providing at least one decorative panel, the panel comprising a core layer comprising an upper surface and a bottom surface, applying at least one uncured coating onto the upper surface of the panel such that a coating layer is formed, creating a surface texture in the coating layer and curing the coating layer via UV curing.

17 Claims, 2 Drawing Sheets

(51) Int. Cl.
  *B05D 3/12* (2006.01)
  *C09D 5/00* (2006.01)
  *E04F 13/08* (2006.01)
  *E04F 15/10* (2006.01)
  *E04F 15/02* (2006.01)

(56) References Cited

U.S. PATENT DOCUMENTS

| | | | |
|---|---|---|---|
| 2010/0021715 A1 | 1/2010 | Kondo | |
| 2012/0103722 A1* | 5/2012 | Clausi | B32B 27/308 |
| | | | 156/60 |
| 2014/0170359 A1 | 6/2014 | Schwitte et al. | |
| 2014/0175707 A1 | 6/2014 | Wolk et al. | |
| 2016/0201324 A1* | 7/2016 | H?kansson | B30B 5/04 |
| | | | 428/206 |
| 2018/0353992 A1* | 12/2018 | Becker-Weimann | B05D 1/42 |
| 2019/0248100 A1* | 8/2019 | Horio | B32B 9/042 |
| 2020/0139675 A1* | 5/2020 | Baert | B32B 29/04 |
| 2022/0162468 A1* | 5/2022 | Ono | C09D 4/00 |

FOREIGN PATENT DOCUMENTS

| | | | |
|---|---|---|---|
| JP | 2009078516 | | 4/2016 |
| WO | 2006033706 A1 | | 3/2006 |
| WO | 2010088769 A1 | | 8/2010 |
| WO | WO-2014112314 A1 * | 7/2014 | ............ C22C 29/02 |
| WO | 9917930 A1 | | 7/2017 |
| WO | 2017121389 A1 | | 7/2017 |
| WO | 2017133804 A1 | | 8/2017 |
| WO | 2019228621 A1 | | 12/2019 |
| WO | 2020007253 A1 | | 1/2020 |
| WO | 2020009973 A1 | | 1/2020 |
| WO | 2021094625 A1 | | 5/2021 |
| WO | 2021180882 A1 | | 9/2021 |
| WO | WO-2022238162 A2 * | 11/2022 | ......... B23K 26/0006 |

OTHER PUBLICATIONS

Thomas Luc Martine Baert et al.; Flooring Panel; U.S. Appl. No. 17/804,425, filed May 27, 2022.
Thomas Luc Martine Baert et al.; Decorative Panel; U.S. Appl. No. 17/454,381, filed Nov. 10, 2021.
Thomas Luc Martine Baert et al.; Decorative Panel and Method for Producing a Panel; U.S. Appl. No. 17/454,398, filed Nov. 10, 2021.
Thomas Luc Martine Baert et al.; Decorative Panel and Method for Producing a Panel; U.S. Appl. No. 17/657,811, filed Apr. 4, 2022.
Thomas Luc Martine Baert et al.; Floor or Wall Panel and Method of Producing a Floor or Wall Panel; U.S. Appl. No. 17/662,738, filed May 10, 2022.

* cited by examiner

DECORATIVE PANEL AND METHOD FOR PRODUCING A DECORATIVE PANEL

CROSS REFERENCE TO RELATED APPLICATIONS

This application claims priority under 35 U.S.C. § 119 to Netherland Patent Application No. NL 2029278 filed on Sep. 29, 2021, which is incorporated herein by reference in its entirety.

FIELD OF THE INVENTION

The invention relates to a method for producing a decorative panel, in particular a floor panel, wall panel or ceiling panel. The invention also relates to a decorative panel, in particular a floor panel, wall panel or ceiling panel.

BACKGROUND

Aesthetics in both residential and commercial buildings are an important consideration in the construction industry. As a result, the use of decorative flooring, wall, and ceiling panels, known as decorative panels, has become widely popular and the improvement of visual properties thereof is increasingly desired. Design properties of decorative panels generally include the colour, texture, pattern, shape and/or finish of the panel. Of these properties, the finish of the panel plays an important role as it is capable of enhancing, or diminishing, the effect of other properties to the overall aesthetics of the panel depending on the material used and the method of application thereof. One aesthetic factor is the glossiness or sheen of the surface. This glossiness can be defined by a so-called gloss level, which is the ratio of light reflected by the surface measured at an inclination of 60 degrees from a line perpendicular to the surface. The gloss level can for the purpose of this application be categorized as matte (<10% reflection), medium gloss (40-60%) and high gloss (>60%).

The manufacturing of decorative panels generally includes the steps of applying a finishing or coating to the surface of the boards to apply a desired gloss level that complements the décor, while ensuring a desired resistance to staining, scratches, abrasion and the like. The finishing of wood-based and polymeric flooring panels in particular are generally sprayer-, roller- or curtain-applied ultraviolet-cured coatings (UV coatings). Such UV coatings are greatly preferred in industrial application because of their advantages such as speed of production, instantaneous drying time, good abrasion resistance, high clarity and/or gloss finish.

A drawback of commonly known technology is that due to the viscosity of the applied coating and restrictions on smoothness and surface energy of the applicator roller as they are known in the art, the minimum levelness or surface roughness (Ra) of the applied coating is limited. In general, the applied coating thickness has surface roughness Ra variations, forming so called micro-creases on the surface of the coating. This unevenness of surface may not be visible and therefore disadvantageous at lower gloss levels but it poses restrictions at higher gloss levels, at which levels these creases become increasingly visible and unsightly. Such unevenness of surface entails that roller-coatings are limited to a gloss level of 60% at maximum. At this gloss level, obvious patterns of creases can already be discerned on the surface of the UV coating, even with the naked eye, which scatter light and reduce the reflection level of the coating. This unevenness can be expressed in surface roughness Ra, for which regular values when cured through conventional means range from 0.5 to 3.5 μm.

A further problem which arises with the known technology is that current roller applicator method often apply coating evenly over the top surface of the panel, including over any unevenness or texture already present in the panel. Roller-applied UV coatings therefore typically fully match the texture already present in the panel's top surface, which can cause unsightly wavy patterns and/or macro-undulations on the top surface of the panel when applying a higher gloss level. A known method of reducing such macro-undulations is by means of curtain coating, which applies a crosslinkable liquid coating in large quantities of typically more than 100 g/m2, often up to 200 g/m2, that at least partially cover or fill said undulations. The disadvantages of this method include its negative impact on air quality due to large quantities of VOCs being released during and after the process, high cost, and low speed of production. Similarly, there is no known method to control surface roughness beyond the roughness involuntarily created by the viscosity of the coating.

Hence, it is a first possible goal of the present invention to provide an improved control on surface roughness of a coating layer for a decorative panel. Alternatively, it is a second goal to provide method for producing a decorative panel having a relatively high gloss level.

BRIEF DESCRIPTION OF THE DRAWINGS

The invention will be elucidated on the basis of the following non-limitative exemplary embodiments shown in the following figures, wherein.

The invention provides thereto a method for producing a panel, in particular a decorative panel, more in particular a floor panel, wall panel or ceiling panel, comprising the steps of:

a) providing at least one decorative panel, the panel comprising at least one core layer comprising an upper surface and a bottom surface;

b) applying at least one coating, in particular an uncured coating, onto the upper surface of the panel such that a coating layer is formed;

c) applying at least one texture layer upon the coating layer, in particular the uncured coating layer, wherein at least part of the texture layer comprises a surface texture and wherein the texture layer is positioned such that at least part of the surface texture is in (direct) contact with the coating layer;

d) subjecting at least part of the texture layer to ultraviolet light such that at least part of the coating layer, in particular part of the coating layer which is covered by the texture layer, is cured, in particular via UV curing; and e) removing the texture layer from the coating layer, in particular the partially cured coating layer; and f) optionally subjecting at least part of the coating layer, in particular the at least partially cured coating layer, to ultraviolet light such that at least part of coating layer, in particular at least part of the uncured part of coating layer is cured, in particular via UV curing, wherein the surface energy of the texture layer, in particular the texture layer applied at step c), is lower than the surface tension of the uncured coating layer, in particular the uncured coating layer formed at step b).

The method according to present invention result in the provision of a decorative panel having a (predetermined) surface roughness which will positively influence the gloss level of the panel. In particular the use of at least one texture layer which is positioned upon the coating layer, in particular the uncured coating layer, which coating layer is subsequently subjected to ultraviolet light for curing purposes, enables that the upper surface of the coating layer will substantially follow the shape of the textured surface of the texture layer. Basically, the upper surface of the (at least partially) cured coating layer has a texture which is an inverse of the texture of the texture layer. This will result is a panel, and in particular the coating thereof, having a predetermined surface roughness. The ability to obtain a coating layer having a predetermined surface roughness enables that the present limitations on the maximum gloss level of the panel can be overcome. The use of at least one texture layer upon the uncured coating layer might further positively contribute to the spread of coating over the upper surface of the core, such that possible irregularities and/or undulations will be overcome. The final gloss level of the panel depends on the applied texture layer, where typically a relatively high microscopic roughness of the coating layer will cause a matte surface, and a relatively low roughness will cause a glossy surface.

That the surface energy of the texture layer applied at step c) is lower than the surface tension of the uncured coating layer formed at step b), causes hydrophobic behaviour of the texture layer with respect to the (uncured) coating layer. This hydrophobic behaviour allows at least part of the (upper surface of the) coating to cure without sticking to the texture layer. This is beneficial as it enables a good transfer of the texture to the coating layer. It further enables smooth removal of the texture layer without negatively affecting or even damaging the (partially cured) coating layer. This increases the predictability and/or repeatability of the process and thus of the final product. The texture layer is preferably positioned such that at least part of the surface texture is in direct contact with the coating layer. This enables better transfer of the structure of the surface texture. The direct contact between the texture layer and the coating layer ensures that an inert environment is present for the crosslinking to occur during curing of the coating layer. Basically, the direct contact may prevent that the (uncured) coating layer is exposed to oxygen and/or moisture, which could for example present in the environment, which oxygen and/or moisture could cause degradation of the coating layer during the UV curing step. In fact, incorporating an inerting chamber in the production process or an inerting step as to prevent contact of the (uncured) coating with oxygen and/or moisture may be omitted by applying the method according to the present invention. The use of nitrogen for creating an inert environment by itself causes increased cost for production, as well as concerns for storage and impact on the environment. Control of oxygen and moisture levels are especially crucial in the production of especially matte or high gloss coating finishes due to the high visibility of variations in gloss and variations in surface texture. Oxygen and moisture present in non-inert environs might significantly affect the crosslinking process of the coating. The method according to the present invention can be applied under ambient conditions. Hence, the method according to the present invention allows a greater production efficiency at lower cost and no concern for the environment when compared to a process requiring the use of nitrogen.

The method steps are preferably subsequent steps. Step b) can also be described as applying at least one coating layer, in particular at least one uncured coating layer, onto the upper surface of the panel. The method according to the present invention is in particular suitable for manufacturing a decorative panel having a gloss level in the range of 60% to 100%. The method according to the present invention basically enables to provide a surface texture to the top surface of a panel, in particular the coating layer, which surface texture is not limited by the flatness or texture already present in upper surface of the panel or core or core layer thereof. Hence, the roughness of the coating layer can be controlled in an efficient manner which is independent of the upper surface of the core layer or panel as such.

The at least partially cured coating layer obtained after step e) and/or f) is basically a textured coating layer. When it is referred to the coating layer also a UV coating layer can be meant. The coating layer as referred to in the present invention is typically a substantially transparent coating layer. The texture layer is in particular configured to transfers a low roughness to the coating layer during curing. The texture layer can also be referred to as textured layer. Preferably, the texture layer is stable in shape. The texture layer is typically at least partially permeable to ultraviolet light.

The panel according to the present invention typically comprises at least one core layer. Said core layer comprises at least an upper surface and a bottom surface. The panel, and in particular the core layer, may optionally comprise complementary coupling parts. The core could for example comprise at least one pair of opposite side edges which are provided with complementary coupling parts. The complementary coupling parts, if applied, are typically configured for interconnecting adjacent panels. Typically, at least one pair of opposite side edges of the core layer is provided with complementary coupling parts. For example, the core layer comprises at least one pair of complementary coupling parts on at least two of its opposite side edges. Said coupling parts may for example be interlocking coupling parts configured for mutual coupling of adjacent panels on multiple directions. Preferably, said interlocking coupling parts provide locking in both horizontal and vertical directions. Any suitable interlocking coupling parts as known in the art could be applied. For example, said interlocking coupling parts may be in the form of complementary tongue and groove, male and female receiving parts, a projecting strip and a recess configured to receive said strip or any other suitable form. It is conceivable the complementary coupling parts require a downward scissoring motion when engaging, or are locked together by means of a horizontal movement. It is further conceivable that the interconnecting coupling mechanism comprise a tongue and a groove wherein the tongue is provided on one side edge of one pair of opposite side edges, and the groove is provided on the other side edge, or an adjacent side relative to that of the tongue, of the same pair of opposite side edges. Such a design of coupling mechanism is well-known in the art and has proven highly suitable for panels for floor coverings such as a floating floor. In a further embodiment it is possible that the interconnecting coupling mechanism have an interlocking feature which prevents interconnected panels from any free movement (play). Such an interlocking feature may be a projection and a respective recess provided on the respective opposite side edges by which neighboring panels interlock with each other. It is conceivable for provisions of reinforcement in the interlocking coupling parts to improve strength and prevent breakage thereof during installation of the panels. For example, the complementary or interlocking coupling parts may be reinforced with materials such as but not limited to fiberglass mesh, reinforcing sheets, carbon fibers, carbon nanotubes, ceramics, glass, arrays of metallic or non-metallic rods, or polymer compounds integrally formed in the core layer. It is also conceivable that a strengthening coat layer of micro or nanotechnology is added on the surface of the interlocking coupling parts. The panel according to the present invention and/or the panel obtained via the method according to the present invention is suitable for use in flooring, wall or ceiling coverings preferably featuring a locking mechanism. As such a 'floating' covering can be assembled by interconnecting the individual panels with each other at all four sides, without the need for adhesives.

In particular, there is a need for a method of manufacturing a decorative panel having a high gloss level, which resembles highly glossy real stone or marble tiles. This goal can be achieved by applying the method according to the present invention.

It is beneficial if a first, and in particular upper part of the coating is cured during step c) and that a remaining part of the coating layer is cured after removal of the texture layer. In this way, the energy applied during the UV curing can be reduced during the second curing step. This can be explained by the more efficient way of direct UV light irradiating the coating layer instead of via the interference of at least one texture layer. However, it is also conceivable that full curing is obtained during step c), resulting that step f) can be omitted.

The surface energy of the texture layer applied at step c) is preferably at most 25 dyn/cm or 25 mN/m. It is also conceivable that the surface energy of the texture layer applied at step c) is less than 30 dyn/cm, preferably less than 25 dyn/cm and more preferably less than 20 dyn/cm. It is conceivable that during step c) a force is applied to outspread and/or stretch the texture layer over the (uncured) coating layer, for example to ensure full contact between the textured surface of the texture layer and the coating layer. The texture layer may also have a surface energy below 38 dynes per centimetre. It is also conceivable that during step c) a force is applied to the texture layer, in particular in order to transfer the surface texture to the coating layer. It is conceivable that the force is applied for a predetermined amount of time. The force can be removed prior to subjecting the texture layer to ultraviolet light. It is conceivable that the surface energy of the texture layer once applied upon the coating layer is at most 25 dyn/cm or 25 mN/m. It is also conceivable that the surface energy of the texture layer once applied upon the coating layer is less than 30 dyn/cm, preferably less than 25 dyn/cm and more preferably less than 20 dyn/cm. Said preferred values for the surface energy of the texture layer are relatively low, and in particular lower than the surface tension of the (uncured) coating layer, wherefore said surface energy can create a type of hydrophobicity with respect to the coating layer. This prevents sticking of the coating layer to the texture layer during and/or after curing thereof.

The texture layer is typically at least partially permeable to ultraviolet light. Preferably, at least part of the texture layer has an UV-A transparency, or UV-A permeability, of at least 60%. It is for example conceivable that at least part of the texture layer has an UV-A transparency in the range of 60% to 100%, in particular in the range of 70% to 90%.

In a preferred embodiment, at least part of the texture layer, for example at least part of the surface texture of the texture layer, has a wavelength cut-off in the range of 150 to 400 nm, more preferably in the range of 240 to 380 nm and even more preferably in the range of 280 to 315 nm. Said preferred ranges provide a wavelength cut-off which is the wavelength at which the texture layer turns opaque to UV rays. Alternatively, the texture layer may have a wavelength cut-off of at least 100 nanometres.

It is further preferred that at least part of the texture layer comprises a plurality of micro-undulations, for example at least part of the surface texture of the texture layer may comprise a plurality of micro-undulations. Preferably, at least a part of the micro-undulations has a peak to valley height Rz of 1.5 µm or less, more preferably 1.0 µm or less, even more preferably 0.75 µm or less. It is also conceivable that at least a part of the micro-undulations has a peak to valley height Rz of 0.6 µm or less or 0.5 µm or less. It also conceivable that the micro-undulations have an average peak to valley height Rz of 1.0 µm or less, more preferably 0.75 µm or less, and even more preferably 0.6 µm or less or 0.5 µm or less. The use of a texture layer having said micro-undulations may result in obtaining having a panel having a substantially the same micro-undulations, in particular an inverse thereof.

The configuration of the texture layer may depend upon the preferred characteristics of the final (cured) coating layer and/or of the panel. Typically, at least part of the (at least partially) cured coating layer has a predetermined surface height variation. The final gloss level of the panel, or of the coating layer, at least partially depends on the applied texture layer. Typically, a relatively high microscopic roughness of the coating layer will cause a matte surface and a relatively low roughness will cause a glossy surface. The invention is in particular focused upon obtaining a panel having a relatively high surface gloss, of at least 60%, preferably in the range of 80% to 100%. However, it is also conceivable to adapt the texture layer such that gloss levels in the range of 5% to 50% are obtained. Also, the texture pattern or surface pattern of the texture layer may have influence on the final product. It is for example possible that at least part of the texture layer comprises a randomized surface pattern. It is also conceivable that at least part of the surface pattern of the texture layer defines a repeated pattern. It is thus also possible that is that the coating layer has a selectively repetitive pattern. Specific modification of the (surface pattern of the) texture layer can in fact realize a gloss level manipulation. It is for example also conceivable that the surface pattern is designed such that a panel having different gloss level zones is obtained. The texture layer may also comprise a texture, degree of roughness, markings, indicia, or haptic features. At least part of the texture layer may have a gloss level between 40 to 90%. The texture layer may have a matte or semi-matte finish.

As said, the roughness of the texture layer applied in the method according to the present invention is of importance for the roughness of the panel which is to be obtained. A relatively low surface roughness can thereby positively contribute to increasing the final gloss level of the panel, or the coating layer thereof. It is for example conceivable that at least part of the texture layer has a surface roughness (Ra) below 0.1 μm Ra, preferably below 0.075 μm Ra and more preferably below 0.05 μm Ra. It is in particular preferred if at least part of the texture layer has a surface roughness of at most 0.05 μm Ra. It is also conceivable that the surface roughness is in the range of 0.025 and 0.035 μm Ra. The latter may result in a panel having a gloss level over 90%. It is conceivable that the surface texture of the texture layer has a roughness as indicated above.

Basically, the texture layer can be applied to adapt and/or obtain a desired gloss level, physical texture, surface flatness, texture and/or a combination of textures, smoothness, roughness, coarseness, haptic features, markings, indicia, patterns, matte-ness and/or sheen.

The texture layer could further at least partly be made of a low surface energy plastic (LSE plastic), in particular chosen from the group of polypropylene (PP), polyethylene (PE or HDPE), polypropylene (PP), polyethylene (PET), polystyrene (PS), acetal and/or ethylene vinyl acetate (EVA). These material(s) benefit of a relatively low surface energy which is beneficial for use in the method according to the present invention. In addition to that the coating layer, typically having a higher surface tension, would not stick to the texture layer. This enables smooth removal of the texture layer which could be re-used after application thereof. The texture layer can for example be a (textured) sheet of a low surface energy plastic. Such plastic material can benefit of being relatively strong but also flexible making the low surface energy plastics suitable for frequent use. The texture layer may also comprise a material selected from the group consisting of thermoplastic material, thermosetting material or a combination thereof. The texture layer may for example comprises a material selected from the group consisting of low density polyethylene (LDPE), linear low-density polyethylene (LLDPE), ultra-low density polyethylene (ULDPE), metallocene polyethylene (mPE), high density polyethylene (HDPE), polypropylene (PP), polycarbonate (PC), polyvinyl chloride (PVC), polyester film, polyvinylidene chloride (PVDC), polyamide (PA), or combinations thereof.

The energy output of ultraviolet light applied during step d) (and/or step f)) is in the range of 100 to 200 mJ/cm2 and/or wherein the ultraviolet light has a wavelength in the range of 150 nm to 400 nm, in particular in the range of 280 nm to 380 nm. Said parameters could initiates a crosslinking step between the coating's at least one polymer component and at least one photo-initiator, if applied. Said parameters may ensure that the at least part of the coating layer is cured under the interference of the texture layer.

The energy output of ultraviolet light during step f) (and/or step d) is in the range of 600 to 900 kJ/cm2. These parameters will enable that final and complete curing of the coating layer can be achieved.

The at least one (uncured) coating layer can applied via roller coating in particular during step b). It is for example conceivable that an EPDM roller is applied. More in particular, an ethylene propylene rubber (EPDM) roller with a Shore D hardness of about 35 and/or a surface energy of 25 mN/m or 25 dyn/cm can be applied. However, it is also conceivable that at least one coating layer is applied via spray coating.

The method according to the present invention enables that relatively thin coating layers can be applied. This is beneficial for economic reasons, but also for environmental reasons as it may reduce the amount of emitted volatile organic compounds in particular during the manufacturing process. At least one coating layer can for example be applied with a weight of 5 to 15 g/m2 per layer, preferably at average thickness of 5 to 15 Ra. Preferably, at least one coating layer is applied with a quantity of less than 100 g/m2, more preferably lower than 75 g/m2. It is for example also conceivable that at least one coating layer is applied with a weight in a range 40 to 60 g/m2. The method according to the present invention benefits of the fact that a curtain coating is not needed to obtain a desired coating layer. In fact, the method enables the use of a relatively thin coating layer for a desired gloss level due to the applied texturing step. The method according to the invention enables sufficient spread and control of the coating layer to obtain a desired result. The coating layer can for example also have a thickness between 1 to 100 μm and/or a coating layer surface variance of 60%.

Preferably, the uncured coating applied at step b), and/or the (uncured) coating layer, has a viscosity in the range of 500 to 1500 Pa·s at 25 degrees Celsius. Said viscosity is in particular a Brookfield viscosity. It is also conceivable that the uncured coating has a viscosity is in the range of 500 to 1000 Pa·s at 25 degrees Celsius or in the range of 1000 to 1500 Pa·s at 25 degrees Celsius. However, depending on the desired use, it is also conceivable that the uncured coating has a viscosity is in the range of 500 to 750 Pa·s, 750 to 1000 Pa·s, 1000 to 1250 Pa·s or 1250 to 1500 Pa·s at 25 degrees Celsius. The coating layer may further have a density between 150 to 350 g/m2. The coating layer may also have a coefficient of friction between 0.5 to 0.9 when measured according to for example EN 13893.

The (uncured) coating layer preferably has a surface tension of at least 25 dyn/cm. Preferably said surface tension is lower than 30 dyn/cm3. It is for example conceivable that the (uncured) coating layer has a surface tension in the range of 26 to 30 dyn/cm.

The coating applied is preferably a polymer based coating. The uncured coating and/or the coating layer comprises typically at least one crosslinkable prepolymer, at least one photo-initiator and/or at least one additive. The uncured coating applied at step b) preferably comprises at least one crosslinkable oligomer and/or at least one monomer and/or at least one photo-initiator. At least one crosslinkable prepolymer may for example comprise at least one acrylic lacquer and/or polyurethane. The), at least one photo-initiator is typically configured to enable UV curing and/or crosslinking. A further additive may be applied in order to improve scratch, abrasion, slip resistance and/or UV resistance. In case a crosslinkable oligomer is applied, the at least one crosslinkable oligomer is preferably an acrylic oligomer or a polyurethane oligomer. The at least one photo-initiator is preferably activatable or activated at the same wavelength that is allowed to pass through the texture layer. The coating layer may also comprise a material selected from the group consisting of thermoplastic material, thermosetting material, polyurethane coating, acrylic coating, epoxy polyol coating, polyvinyl chloride (PVC), polypropylene (PP), polycarbonate (PC), abrasion resistant material, slip resistant material, water resistant material, chemical resistant material, temperature resistant material, or a combination thereof. It is also conceivable that the coating layer comprises a photo-initiator that is cross-linked or cross-linkable via a UV or electron beam curing process.

The coating layer may further comprise an antimicrobial agent. Said antimicrobial agent may be incorporated in the coating layer before the curing step. The antimicrobial agent embedded in the coating layer is conceived to be able to inhibit the emergence and/or growth of microbes such as fungus, bacteria (i.e. gram positive and gram negative bacteria such as *Staphylococcus aureus, Kleibsella pneumoniae* and *Salmonella* and the like), yeast and other pathogens including nonpathogens on the surface of the floor panel. It is conceivable that the antimicrobial agent may be organic or inorganic, preferably non-toxic and without heavy metals. The antimicrobial agent may be selected from the group consisting of quaternary ammonium compounds, sesquiterpene alcohols, halogenated phenyl ethers, halogenated carbanilides, halogenated salicylanilides, bisphenolic compounds, general phenols, formaldehyde, pyridine derivatives and hexachlorophene. The aforementioned antimicrobial agents are preferred over disinfectants such as iodine and complexes thereof as these are highly pigmented and may cause detrimental effects to the chemical, mechanical and physical properties of the coating layer, specially to the transparency/clarity of the coating layer which is desired in order to conserve the aesthetics of the panel. The antimicrobial agent, if applied, is preferably present in the coating layer from about 0.05% to about 5% by weight, preferably from about 0.070% to about 3.5%, more preferably from about 0.080% to about 3%. It is experimentally found that said amount of antimicrobial agent in the coating layer is able to survive crosslinking/polymerization during the curing process, or in other words is not destroyed during curing, without causing undesirable effects to the chemical, mechanical and physical properties of the coating layer. Said amount of antimicrobial agent in the coating layer is also experimentally found to last the lifetime of the coating layer while also being sufficient to inhibit the formation and/or growth of microbes.

The panel preferably comprises at least one décor layer. It is conceivable that at least one décor layer is attached to the core layer, if applied. It is also conceivable that the décor layer is a print layer. The décor layer may also form integral part of the core layer. In a beneficial embodiment of the panel, at least part of the upper surface of the core layer is provided with at least one decorative pattern or decorative image. It is for example possible that such decorative image or pattern is provided via printing, for example via digital and/or inkjet printing. It is also possible that at least one decorative pattern is formed by relief provided in the upper surface of the core layer or panel. The method may include the step of applying at least one decorative image onto the core layer. It is also possible that the method includes the step of providing at least one decorative layer onto the core layer. Said step is preferably provided prior to the coating layer is applied. The coating layer can be directly applied upon the décor layer and/or decorative layer. It is also conceivable that the décor layer or decorative layer is a separate layer, for example a comprises a high-pressure laminate (HPL), a veneer layer and/or a ceramic tile. It is for example possible that the décor layer comprises a plurality of impregnated layers containing lignocellulose but also a wood veneer, a thermoplastic layer, a stone veneer, a veneer layer or the like and/or a combination of said materials. The veneer layer is preferably selected from the group comprising of wood veneer, cork veneer, bamboo veneer, and the like. Other materials such as ceramic tiles or porcelain, a real stone veneer, a rubber veneer, a decorative plastic or vinyl, linoleum, and laminated decorative thermoplastic material in the form of foil or film. The thermoplastic material can be PP, PET, PVC and the like. The design of the decorative layer can be chosen from a design database which includes digitally processed designs, traditional patterns, pictures or image files, customized digital artworks, randomized image pattern, abstract art, wood-patterned images, ceramic or concrete style images, or user-defined patterns. The designs can be printed or reproduced using laser printers, inkjet printers, or any other digital printing means including the conventional printing methods. Various types of inks can also be used to suit the design needs of the décor layer. Preferably, the ink used during the printing method comprises properties such as but is not limited to waterproofness, lightfastness, acid-free, metallic, glossy, sheen, shimmering, or deep black, among others. It is desirable that the decorative layer is visually exposed by a substantially transparent coating layer. The décor layer may comprise a pattern, wherein the pattern is printed via digital printing, inkjet printing, rotogravure printing machine, electronic line shaft (ELS) rotogravure printing machine, automatic plastic printing machine, offset printing, flexography, or rotary printing press.

The panel may comprise at least one further layer, such as but not limited to a backing layer. The method may also include the step of providing and/or attaching at least one backing layer to the bottom surface of the core layer. In case a backing layer is applied, the backing layer can be adhered on the bottom surface of the core layer via an adhesive. The backing layer is preferably made of a polymer material, for example but not limited to polyurethane. The backing layer may also be a sound absorbing layer. Such sound absorbing backing layer may further contribute to the good acoustic properties of the panel. Such backing layer may also be referred to as an acoustic layer. The backing layer may be composed of a foamed layer, preferably a low-density foamed layer, of ethylene-vinyl acetate (EVA), irradiation-crosslinked polyethylene (IXPE), expanded polypropylene (XPP) and/or expanded polystyrene (XPS). However, it is also conceivable that the backing layer comprises nonwoven fibers such as natural fibers like hemp or cork, and/or recycled/recyclable material such as PET. The backing layer, if applied, preferably has a density between 65 kg/m3 and 300 kg/m3, most preferably between 80 kg/m3 and 150 kg/m3.

The panel, and in particular the core layer may comprise a composite material. The core layer may for example comprise a filler and at least one binder. The binder can be selected from, but is not limited to, thermoplastic or thermoset resins including but not limited to vinyl, polyvinyl chloride (PVC), polyethylene (PE), polyurethane (PU), acrylonitrile butadiene styrene (ABS), melamine, and/or polypropylene (PP). Preferably, the ratio of weight percentages of filler relative to binder is at least 1:1, more preferably at least 2:1, most preferably at least 3:1. The filler material used in the core layer can comprise organic or inorganic materials which includes but is not limited to cellulose materials, fibrous materials, kraft paper, saw dusts, wood dusts, wood fibers, long wood fibers, short wood fibers, sand, lime, volcanic ash, plants-based fibers such as mushroom fibers, cotton fibers, bamboo fibers, abaca fibers, pineapple fibers, magnesium compounds, magnesium oxide, magnesium carbonate, limestone, polymeric fibers, glass fibers, carbon-based fibers, polymeric pellets, or hollow microspheres or particles having size ranging from 1 to 1000 micrometers made of but is not limited to ceramics, glass, polymers, composites, or metals.

It is conceivable that at least one core layer, if applied, comprises a composite material, in particular a mineral composite material. The core layer may for example comprise a magnesium oxide or MgO-based composite. The core layer may for example comprise MgCl2 and/or MgSO4. The composite core layer may for example comprise at least 20% by weight of magnesium oxide. A non-limiting example of a possible composite core layer, is a core layer comprising 30 to 40% by weight magnesium oxide, 10 to 20% by weight magnesium chloride or magnesium sulfate, 10 to 15% by weight water, 5 to 10% by weight magnesium hydroxide, 5 to 10% by weight calcium carbonate, 5 to 50% by weight lignocellulose (e.g. wood fibers or cork) and/or 10-15% by weight additives. It is found that a composite core layer, in particular a mineral composite core layer, has a good stability to heat which is also beneficial for the panel as such. The density of at least one core layer is preferably between 1200 and 2000 kg/m3, more preferably between 1400 and 1600 kg/m3. However, it is also conceivable that the density of at least one core layer is about 2000 kg/m3. The latter is for example possible when the core layer comprises an thermoplastic mineral composite. The mineral material can be selected from the group of magnesium oxide, magnesium carbonate, magnesium oxysulfate, magnesium oxychloride cement (MOC), magnesium chloride (MgCl2), magnesium sulfate (MgSO4), Sorel cement, fiber cement, MOS cement, limestone, calcium carbonate, calcite mineral, stone, chalk, clay, calcium silicate and/or talc. In some embodiments, the mineral material is preferably present as particulate mineral filler of at least 200 mesh, preferably more than 300 mesh. The thermoplastic mineral composite core layer may for example comprise 60 to 70% by weight of calcium carbonate, 20 to 25% by weight of polyvinyl chloride and possibly 5 to 10% by weight of additives. At least one core layer may comprise a density gradient, for example wherein the density near the upper surface is higher than the density near the bottom surface, or wherein the density near the upper surface and the bottom surface is higher than the density of a central region situated between said upper surface and bottom surface. A further non-limiting example of a possible core layer is an HDF based core layer comprising cellulose and a thermosetting resin. It is also conceivable that the core is a wood-based core comprising cellulose and/or a geopolymer based on magnesium oxide. The core can also be a foamed core. The panel and/or the core is preferably waterproof.

The core layer may for example have a thickness of at least 4 mm. It is for example possible that the thickness of the core layer is between 3 and 9 mm, preferably between 4 mm and 5.5 mm or between 5.5 mm and 7 mm. It is conceivable that at least one core layer comprises at least one reinforcing layer. The reinforcing layer can for example be a reinforcing mesh. Possibly, the core comprises at least two reinforcing layers, wherein a first reinforcing layer is located near the upper surface and wherein a further reinforcing layer is located near the bottom surface. Preferably, at least one reinforcing layer comprises a mesh or web, preferably comprising fiberglass, jute and/or cotton.

The surface energy of the core layer, or panel, is preferably at least 32 dyn/cm. Preferably at least part of the upper surface of the core layer or panel, possibly including a décor layer, whereupon the coating layer is to be provided has a surface energy of at least 32 dyn/cm. Such panel will provide sufficient bonding and/or surface wetting for the coating to be applied. In case the surface energy of the panel is too low, it is possible the use a plasma or corona treatment step in order increase the surface energy. In some embodiments, the coating layer comprises multiple sublayers or secondary coating layers that are stacked on top of each coating layer. The secondary coating layers may have the same properties with the coating layer. In some cases, the secondary coating layers can provide enhancing effects to the coating layer such as an increase in the UV protection or wear resistance, for example. It is also conceivable that the surface energy of the core layer, or panel, is at least 40 dyn/cm or at least 45 dyn/cm.

When it is referred to a panel, also a substrate can be meant. The method may subsequently include the step of cutting the substrate into separate (decorative) panels. This step is preferably done after the coating layer is fully cured.

It is further conceivable that multiple coating steps are applied in the method according to the present invention. Hence it is conceivable that the method comprises a sequence of steps b)-e) or f).

The invention further relates to a method for producing a decorative panel, in particular a floor panel, wall panel or ceiling panel, comprising the steps of.
  a) providing at least one decorative panel, the panel comprising an upper surface and a bottom surface;
  b) applying at least one uncured coating onto the upper surface of the panel such that a coating layer is formed;
  c) applying at least one transfer layer upon the coating layer, in particular the uncured coating layer;
  d) subjecting the transfer layer to an imprinting step via at least imprinting element, wherein at least part of the imprinting element comprises a surface texture which is in contact with the transfer layer during the imprinting step such that the surface texture of the imprinting element is transferred to the coating layer under the interference of the transfer layer;
  e) subjecting at least part of the transfer layer to ultraviolet light such that at least part of the coating layer is cured;
  f) removing the transfer layer from the coating layer, in particular the partially cured coating layer; and
  g) subjecting at least part of the coating layer to ultraviolet light such that at least part of the uncured part of coating layer is cured,
  wherein the surface energy of the transfer layer applied at step c) is lower than the surface tension of the uncured coating layer formed at step b).

The imprinting element can for example be a stamp. The surface texture of the imprinting element can be in line with any of the above described surface textures and/or may have any of the above described characteristics. Step d) is preferably performed for a predetermined amount of time. The imprinting element may be removed prior to the transfer layer is subjected to UV curing. The transfer layer can be a substantially smooth layer. The transfer layer is preferably relatively thin, for example in the range of 0.01 to 1 mm. It is also conceivable that the transfer layer has a thickness in the range of 0.05 to 0.7 mm. The transfer layer may further have any of the characteristics as described for the texture layer according to the present invention.

The invention further relates to a decorative panel, in particular a floor panel, wall panel or ceiling panel, wherein the panel comprises an upper surface and a bottom surface, wherein at least one coating layer is applied layer onto the upper surface of the core, or panel, wherein at least part of the coating layer is a textured coating layer having a surface roughness (Ra) of at most 0.5 µm, preferably at most 0.1 µm, more preferably at most 0.05 µm. The invention also relates to a decorative panel, in particular a floor panel, wall panel or ceiling panel, wherein the panel comprises an upper surface and a bottom surface, wherein at least one coating layer is applied layer onto the upper surface of the core, or panel, wherein at least part of the coating layer comprises a textured surface having a surface roughness of at most 0.5 μm, preferably at most 0.1 μm, more preferably at most 0.05 μm.

The panel experiences the same benefits as the panel obtained via the method according to the present invention. The panel is preferably made via a method according to the present invention. It is conceivable that the surface roughness of the coating layer is at most 0.05 μm Ra. It is for example conceivable that the surface roughness is in the range of 0.025 and 0.035 μm Ra. The latter may result in a panel having a gloss level over 90%. At least part of the coating layer may comprise a plurality of micro-undulations while maintaining a surface roughness Ra smaller than 0.5 μm, wherein at least a part of the micro-undulations has a peak to valley height Rz of 1.0 μm or less, preferably 0.75 μm or less, and more preferably 0.5 μm or less. This ensures that the micro-undulations do not negatively affect the visual effects of the panel. In some cases, the micro-undulations adds texture to the embossed portions and provides a more detailed tactile features. The panel has a gloss level higher than 60%, preferably higher than 70% and more preferably higher tan 80%. It is also conceivable that the panel has a gloss level in the range of 65% to 100%. Alternatively, it is also possible that the decorative panel has a gloss level between 40 and 90%. The coating layer may have a light reflectance between 5 and 15% and/or the coating layer may have a satin or matte finish. The panel may further comprise at least one décor layer and/or any of the further described optional layers according to the present invention. The core and/or further layers may be any of the described embodiments for the corresponding method. The panel may for example include complementary coupling parts.

The invention is also related to an alterative method for producing a decorative panel. Said method comprises the steps of: providing a core layer; applying at least one coating layer on top of the core layer; applying a force on the at least one coating layer to reach a surface flatness of at most 5 mm; and curing the at least one coating layer. The force applying step can be achieved by use of a film, such as a film comprising a surface texture or feature, provided on top of the at least one coating layer. The method may further includes a step of transferring a surface feature of the film onto the at least one coating layer. Preferably, said surface feature includes surface flatness being 5 mm at most.

As previously described, in order to smoothly transfer the pattern or surface properties of the texture layer onto the at least one coating layer, a pressure, e.g., weight of the texture layer itself, an additional force, may optionally be applied to the texture layer which is applied upon the upper surface of the at least one coating layer. The texture layer may also comprise predetermined coloured surface properties thereon. If applied, said coloured surface properties on the texture layer can be previously printed onto a side of the texture layer. The texture layer may be a transparent film layer, an opaque film layer or a piece of paper such as, but not limited to, e.g. water slide paper. After the texture layer is previously provided with, for example, a black and white pattern or a pigmented pattern, the texture layer can be applied upon an upper surface of the at least one coating layer. A force or pressure can be applied to the exposed side face of the texture layer to commence the surface property transfer onto the upper surface of the at least one coating layer. When the surface property transfer is at least partially completed or finished, the at least one coating layer is typically subjected to a curing process via UV light. After the surface property transfer process is completed or finished, the texture layer which typically no longer has no or little surface property left thereon is removed from the at least one coating layer. Then the at least one coating layer with the surface property transferred from the texture layer can be subjected for a subsequent curing process to secure the pattern which was transferred. In a different preferred embodiment of the present invention, it is conceivable that the surface properties may contain the same dimensional surface property but with different light absorption and refraction due to pigment added thereto. Also, the surface properties may contain different dimensional surface property and have different light reflection and/or the same or different light absorption due to selectively added pigment thereto. Optionally, after the pattern is secured on top of the at least one coating layer, a protection layer, preferably a transparent protection layer, is applied on top of the at least one coating layer to protect the pattern on the at least one coating layer.

Figure 1A:
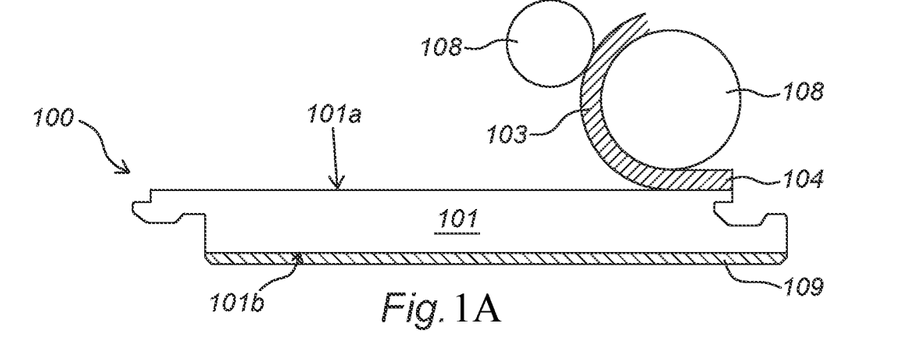
FIG. 1A depicts a first step in a sequence of method steps according to the present invention for producing a decorative panel according to the present invention.
Figure 1B:
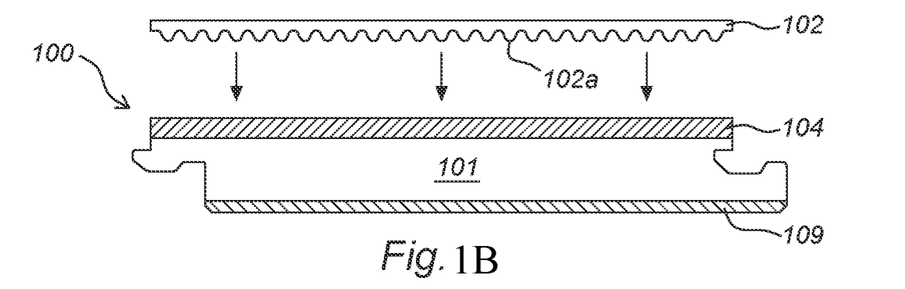
FIG. 1B depicts a second step in a sequence of method steps according to the present invention for producing a decorative panel according to the present invention.
Figure 1C:
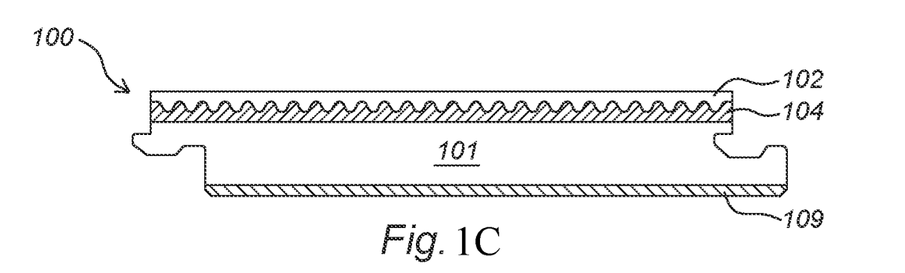
FIG. 1C depicts a third step in a sequence of method steps according to the present invention for producing a decorative panel according to the present invention.
Figure 1D:
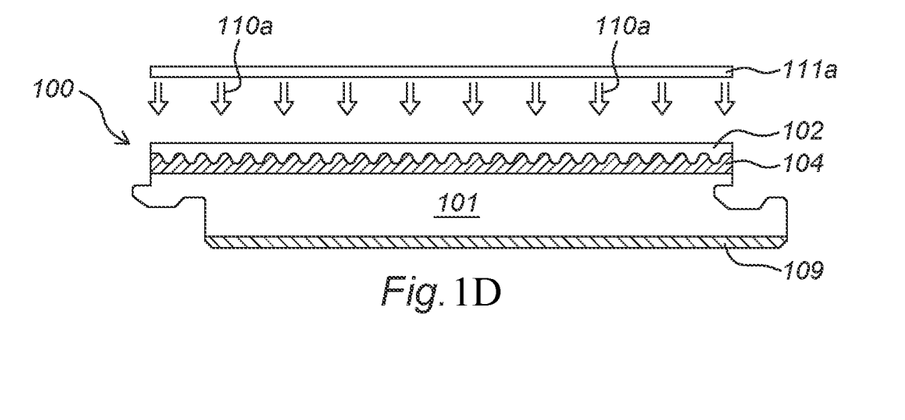
FIG. 1D depicts a fourth step in a sequence of method steps according to the present invention for producing a decorative panel according to the present invention.
Figure 1E:
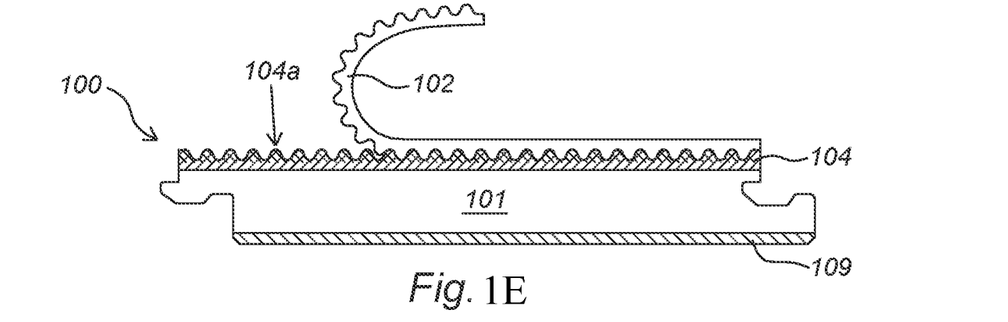
FIG. 1E depicts a fifth step in a sequence of method steps according to the present invention for producing a decorative panel according to the present invention.
Figure 1F:
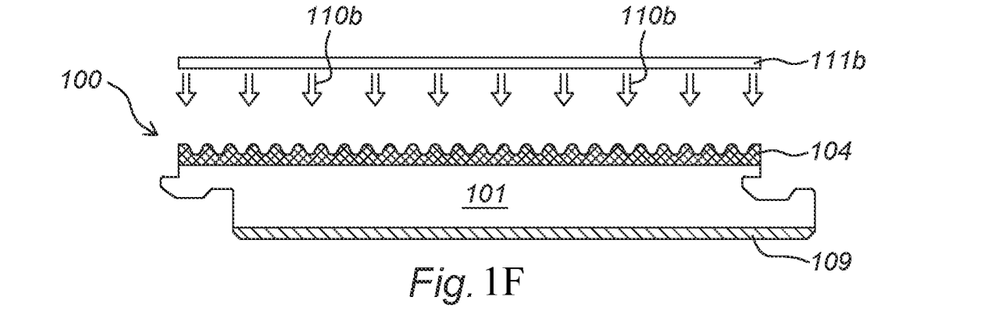
FIG. 1F depicts a sixth step in a sequence of method steps according to the present invention for producing a decorative panel according to the present invention.

FIG. 1A-1F show a schematic representation of a sequence of method steps according to the present invention. The figures show a cross sectional side view. FIG. 1A shows a decorative panel 100, the panel 100 comprises a core layer 101 comprising an upper surface 101a and a bottom surface 101b. In the shown embodiment, the panel 100 comprises an optional backing layer 109. The backing layer 109 is attached to the bottom surface 101b of the core layer 101. FIG. 1A further shows that an uncured coating 103 is applied onto the upper surface 101 of the panel 100 such that a coating layer 104 is formed. The coating layer 104 is applied via roller coating, wherein the figure shows the presence of rollers 108. FIG. 1B shows that the formed coating layer 104 substantially covers the entire upper surface 101a of the core layer 101, and thus of the panel 100. FIG. 1B further shows the presence of a texture layer 102 which is to be applied upon the coating layer 104, in particular the uncured coating layer 104. The texture layer 102 is preferably is at least partly made of a low surface energy plastic. Part of the texture layer 102 comprises a surface texture 102a. The texture layer 102 is positioned such that at least part of the surface texture 102a is in direct contact with the coating layer 104, which can be seen in FIG. 1C. Subsequently, at least part of the texture layer 102 is subjected to ultraviolet light 110a such that at least part of the coating layer 104 is cured. This is shown in FIG. 1D. The ultraviolet light 110a is provided via an irradiation source 111a. At least part of the texture layer 102 is permeable for ultraviolet light in order to ensure curing of at least part of the coating layer 104. When at least part of the upper surface of the coating layer 104 is cured, as can be seen in FIG. 1E, the texture layer 102 can be removed from the coating layer 104. Due to the surface energy of the texture layer 102 being lower than the surface tension of the uncured coating layer 104, it is relatively easy to remove the texture layer 102. The figure further shows that the surface structure 102a of the texture layer 102 is transferred onto the coating layer 104. Hence, the coating layer 104 now comprises a textured upper surface 104a. FIG. 1E shows that the coating layer 104 is subsequently again subjected to a second bundle of ultraviolet light 110b such that at least part of the uncured part of coating layer 104 is cured. The ultraviolet light 110b is provided via a second irradiation source 111b. It can be seen in FIG. 1F that the coating layer 104 is now fully cured. The surface texture 104a of the coating layer 104 has a roughness which corresponds to the roughness of the applied texture layer 102. The energy output of the ultraviolet light 110a applied in FIG. 1D is typically higher than the energy output of the ultraviolet light 110b applied in FIG. 1F, as for the latter the waves are not traveling through an intermediate object 102, in this case the texture layer 102.

Figure 2:
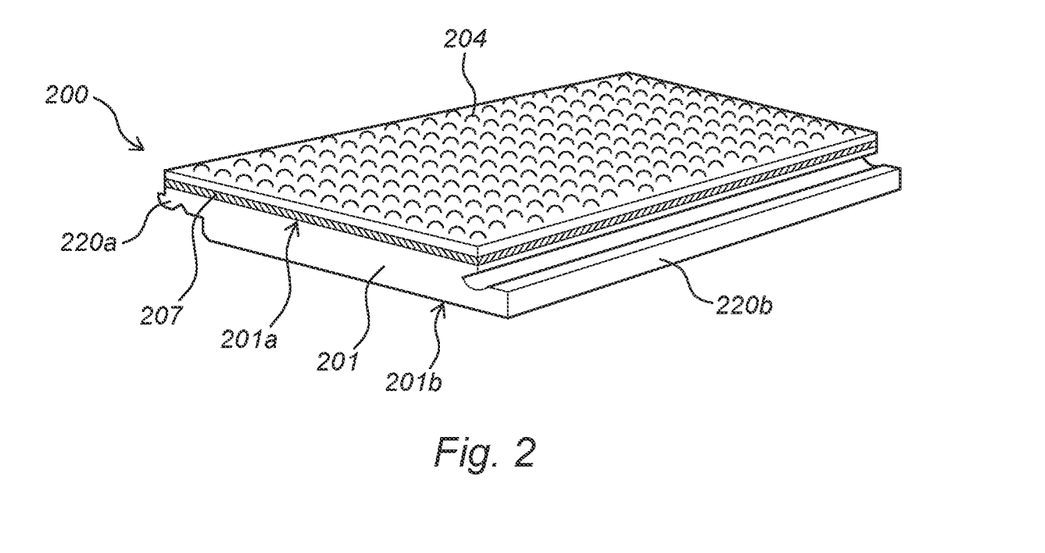
FIG. 2 is a perspective view of decorative panel according to the present invention.

FIG. 2 shows a perspective view of a second embodiment of a decorative panel 200 according to the present invention. The decorative panel 200 is for example a floor panel 200, wall panel 200 or ceiling panel 200. The panel 200 comprises a core layer 201 comprising an upper surface 201a and a bottom surface 201b and a décor layer 207. A coating layer 204 is applied layer onto the upper surface of the panel 200, and in particular the upper surface 201a of the core layer 201 and décor layer 207. The panel 200 is further provided with interconnecting coupling elements 220a 220b. The figure schematically shows that the coating layer 104 is a textured coating layer 104 having a notable surface roughness which causes the panel 200 to have a predetermined gloss level.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A method for producing a panel, wall panel or ceiling panel, comprising the steps of:
    a) providing at least one decorative panel comprising an upper surface and a bottom surface, and further comprising at least one core layer;
    b) applying at least one uncured coating layer onto the upper surface of the at least one decorative panel;
    c) applying at least one texture layer upon the at least one uncured coating layer, wherein at least part of the at least one texture layer comprises a surface texture and wherein the at least one texture layer is positioned such that at least part of the surface texture is in contact with the at least one uncured coating layer;
    d) subjecting at least part of the at least one texture layer to ultraviolet light such that at least part of the at least one uncured coating layer is cured to form an at least partially cured coating layer, wherein an upper surface of the at least partially cured coating layer has a texture which is an inverse texture of the surface texture of at least part of the at least one texture layer;
    e) removing the at least one texture layer from the at least partially cured coating layer;
    wherein the at least one texture layer applied at step c) has a surface energy lower than a surface tension of the at least one uncured coating layer applied at step b); and
    wherein the at least one uncured coating layer applied at step b) has a viscosity in the range of 500 and 1500 Pa*s at 25 degrees Celsius
    and f) optionally, subjecting at least part of the at least partially cured coating layer to ultraviolet light such that at least part of the uncured part of the at least partially cured coating layer is cured.

2. The method according to claim 1, wherein the surface energy of the at least one texture layer applied at step c) is at most 25 dyn/cm.

3. The method according to claim 1, wherein at least part of the at least one texture layer has an UV-A transparency of at least 60%.

4. The method according to claim 1, wherein at least part of the at least one texture layer has a wavelength cut-off in the range of 150 to 400 nm.

5. The method according to claim 1, wherein the at least one texture layer comprises a randomized surface pattern.

6. The method according to claim 1, wherein the at least one texture layer comprises a repeated surface pattern.

7. The method according to claim 1, wherein the at least one texture layer is at least partly made of a low surface energy plastic, chosen from the group of polypropylene, polyethylene, polypropylene, polyethylene, polystyrene, acetal or ethylene vinyl acetate.

8. The method according to claim 1, wherein the ultraviolet light during step d) has an energy output in the range of 100 to 200 mJ/cm$^2$ and/or wherein the ultraviolet light during step f) has an energy output in the range of 600 to 900 kJ/cm$^2$.

9. The method according to claim 1, wherein the at least one uncured coating layer is applied via roller coating in step b).

10. The method according to claim 1, wherein the at least one uncured coating layer is applied with a quantity of less than 100 g/m$^2$.

11. The method according to claim 1, wherein the surface tension of the at least one uncured coating layer is at least 25 dyn/cm.

12. The method according to claim 1, wherein the at least one uncured coating layer applied at step b) comprises at least one crosslinkable oligomer, at least one monomer and/or at least one photo-initiator.

13. The method according to claim 1, wherein the at least one core layer comprises a composite material.

14. The method according to claim 1, wherein the upper surface of the panel has a surface energy of at least 32 dyn/cm.

15. The method of claim 1, further comprising the step of:
    g) forming a panel, wall panel or ceiling panel, wherein the panel, wall panel or ceiling panel has a gloss level higher than 70%.

16. The method according to claim 1, wherein the at least one uncured coating layer in step b) is applied with a weight in the range of 40 to 60 g/m$^2$.

17. The method according to claim 1, wherein one or more of:
    (i) at least part of the surface texture of the at least one texture layer comprises a plurality of micro-undulations and at least a part of the plurality of micro-undulations has a peak to valley height Rz of 1.0 μm or less; and
    (ii) at least part of the at least one texture layer has a surface roughness Ra below 0.1 μm.

* * * * *